(12) United States Patent
Yonetake et al.

(10) Patent No.: US 7,007,416 B2
(45) Date of Patent: Mar. 7, 2006

(54) FLEXIBLE HOSE COVERS FOR A WORK MACHINE

(75) Inventors: Nobukata Yonetake, Tokyo (JP); Kosuke Yanagido, Tokyo (JP); Shigeru Obinata, Hyogo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/514,141

(22) PCT Filed: Apr. 18, 2003

(86) PCT No.: PCT/JP03/04957

§ 371 (c)(1),
(2), (4) Date: Jan. 11, 2005

(87) PCT Pub. No.: WO2004/011322

PCT Pub. Date: Feb. 5, 2004

(65) Prior Publication Data

US 2005/0126053 A1     Jun. 16, 2005

(30) Foreign Application Priority Data

Jul. 25, 2002    (JP) ............................. 2002-217069

(51) Int. Cl.
*E02F 9/00* (2006.01)
(52) U.S. Cl. ........................................ 37/466
(58) Field of Classification Search .................. 37/347, 37/348, 382, 413, 466
See application file for complete search history.

(56) References Cited

FOREIGN PATENT DOCUMENTS

| JP | 54-8725 | 1/1979 |
|---|---|---|
| JP | 59-111854 | 7/1984 |
| JP | 5-331877 | 12/1993 |
| JP | 6-53884 | 7/1994 |
| JP | 10-238664 | 9/1998 |
| JP | 3042239 | 3/2000 |

OTHER PUBLICATIONS

International Search Report for PCT/JP03/004957 mailed on Jul. 29, 2003.

*Primary Examiner*—Christopher J. Novosad
(74) *Attorney, Agent, or Firm*—Darby & Darby (57) ABSTRACT

A plurality of flexible hoses for supplying hydraulic oil from a main body to a traveling motor of a traveling device and discharging hydraulic oil from the traveling motor to the main body. The hoses between the main body and each traveling device are inserted through a flexible tubular hose cover so as to be contained therein. The plurality of hoses can be bundled and protected merely by being inserted through the hose cover. Even in the bundled state, the hoses are permitted to move inside the hose cover together with a width changing movement of the traveling device. The hose cover including a flexible first material member and a second material member having greater shape retention properities than the first material member.

9 Claims, 7 Drawing Sheets

FLEXIBLE HOSE COVERS FOR A WORK MACHINE

CROSS-REFERENCE TO PRIOR APPLICATION

This is a U.S. national phase application under 35 U.S.C. §371 of International Patent Application No. PCT/JP2003/004957 filed Apr. 18, 2003, and claims the benefit of Japanese Patent Application No. 2002-217069 filed Jul. 25, 2002 both of which are incorporated by reference herein. The International Application was published in Japanese on Feb. 5, 2004 as WO 2004/011322 A1 under PCT Article 21(2).

TECHNICAL FIELD

The present invention relates to a work machine which has a traveling device at each lateral side of the main body of the machine.

BACKGROUND ART

Figure 6:
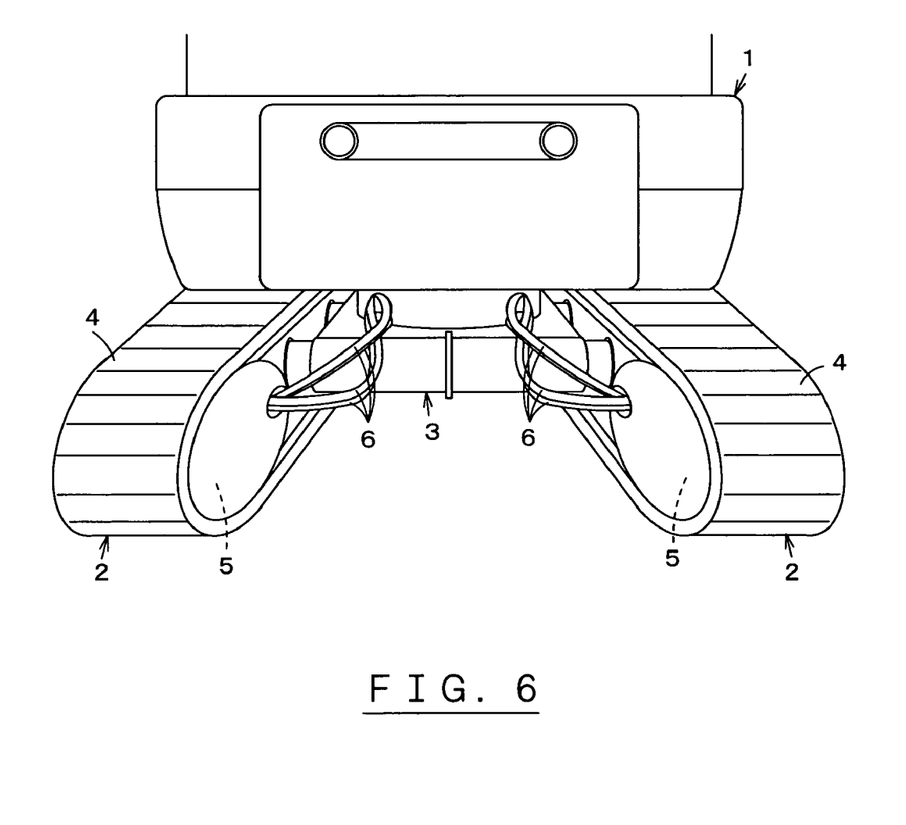
FIG. 6 is a perspective of a conventional work machine in the state where the traveling devices are narrowly spaced apart.
Figure 7:
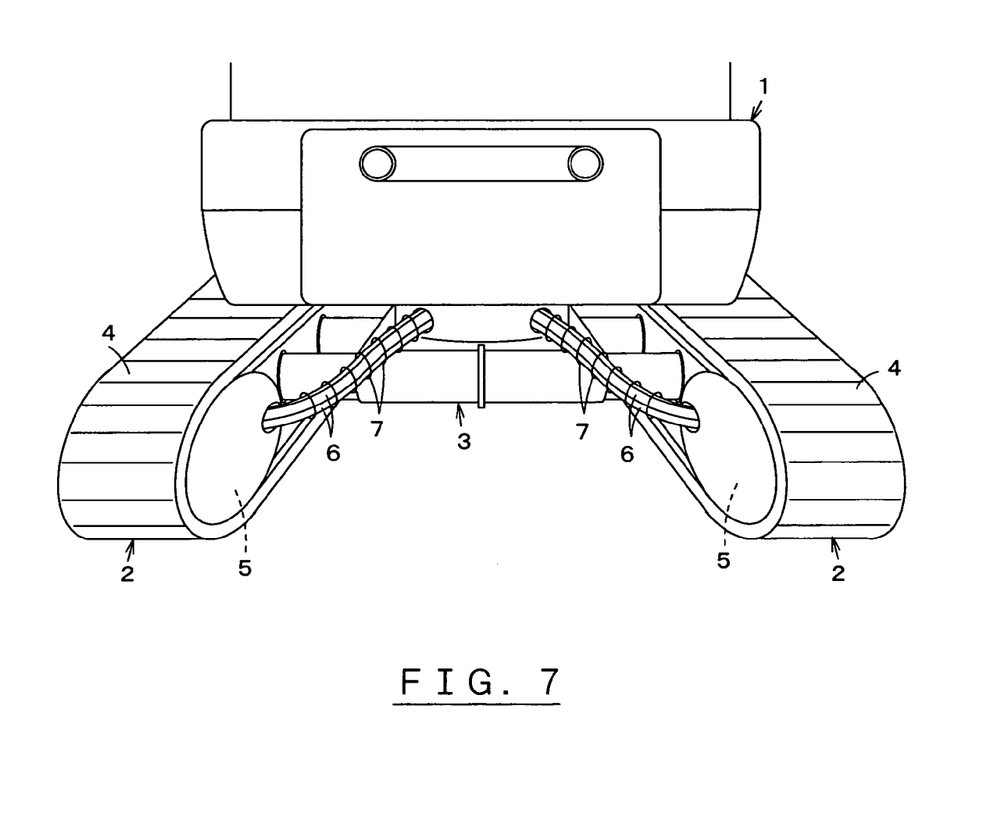
FIG. 7 is a perspective of the conventional work machine in the state where the traveling devices are widely spaced apart, with a plurality of hoses bundled with bands.

FIGS. 6 and 7 show a work machine, which is a hydraulic excavator or the like. The work machine has a main body 1 and traveling devices 2. The traveling devices 2 are respectively disposed at the two widthwise sides of the main body 1.

The main body 1 is provided with a width changing device 3 for changing the widthwise positions of the traveling devices 2 with respect to the main body 1. The width changing device 3 serves to increase the widthwise distance between the traveling devices 2 with respect to the width of the main body 1 in order to ensure the stability during operation of the work machine, and reduce said widthwise distance in order to reduce the distance by which each traveling device 2 projects outward from the widthwise side of the work machine 1.

Each traveling device 2 includes a traveling motor 5 for driving a crawler belt 4. Connected to each traveling motor 5 are a plurality of hoses 6 for supply and discharge of hydraulic oil from a hydraulic pump through a control valve unit and other relevant components to the traveling motor 5. The aforementioned hydraulic pump is mounted on the main body 1.

When the work machine is not equipped with a width changing device 3 for the traveling devices 2, the hoses 6 are normally connected to the traveling motors 5 within the interior of the main body 1 and the traveling devices 2. When the work machine is equipped with a width changing device 3 for the traveling devices 2, the hoses 6 are normally connected at the exterior of the main body 1 and the traveling devices 2 in order to permit operations to change the widthwise distance between the traveling devices 2.

The length of the hoses 6 is so set as to permit increase of the widthwise distance between the traveling devices 2. Therefore, when the widthwise distance between the traveling devices 2 is reduced, the hoses 6 slack as shown in FIG. 6. At that time, as each hose 6 has a tendency to contort, the hoses 6 connected to each traveling motor 5 become distanced from one another. When the work machine is moving, a hose 6 that has displaced downward is prone to come into contact with an obstacle on the ground and may therefore become damaged.

FIG. 7 shows a way to prevent each set of hoses 6 from becoming distanced from one another by securing the plurality of hoses 6 by means of bundling the hoses 6 with a plurality of bands 7 at nearly regular intervals with respect to the lengthwise direction of the hoses 6. In addition to the bands 7, examples of alternate means to secure the plurality of hoses 6 include ring-shaped springs and tapes. When using these alternate means, too, the hoses 6 are secured by being bundled with them in the same manner as when the bands 7 are used.

Even if the hoses 6 are secured by being bundled with the bands 7 or the like, there is still the possibility of a hose 6 coming into contact with an obstacle on the ground and becoming damaged when the work machine is moving, because the hoses 6 themselves are exposed.

Inconvenience of assembly presents another problem; not only is it troublesome to securely bundle a plurality of hoses 6 with a band 7 or the like, but such an operation also has to be conducted at a plurality of locations along the length of the hoses 6.

Securing a plurality of hoses 6 by bundling them with bands 7 or the like presents another problem in that as it limits movement of the hoses 6, an operation to change the widthwise distance between the traveling devices 2 tends to put excessive stress to the hoses 6 and the bands 7 (or other such fixtures), making the bands 7 (or other such fixtures) prone to damage.

In order to solve the above problems, an object of the invention is to provide a work machine which permits easier bundling of a plurality of hoses and ensures protection of the hoses by covering them. Another object of the invention is to provide a work machine which permits bundled hoses to move together with an operation to change the widthwise distance between the traveling devices 2.

SUMMARY OF THE INVENTION

A work machine according to the invention has traveling devices, each of which is disposed at each widthwise side of the main body and provided with at least one fluid pressure-operated device, a plurality of flexible hoses for supplying and discharging hydraulic fluid, and flexible tubular hose covers. Said plurality of hoses consists of a plurality of hoses communicatively extending from the main body to said fluid pressure-operated device(s) of each traveling device via the outside of the main body and the traveling device. Each hose cover is disposed between the main body and each respective traveling device and houses the plurality of hoses connected to the traveling device in the state where the hoses are inserted through the hose cover. With the features described above, by merely inserting a plurality of hoses, which serve to connect the main body and fluid pressure-operated device(s) of each traveling device 13, through a flexible tubular hose cover, it is possible to easily bundle the hoses and reliably cover the hoses to ensure their protection.

Each hose cover of a work machine according to another feature of the invention has at least a double construction having a flexible first material member and a second material member that has a greater ability to retain its shape than the first material member. The hose covers having this feature have both sufficient flexibility to cope with the slack of the hoses contained therein and the shape-retaining ability sufficient to retain said slack to prevent unnecessary further slacking.

A work machine according to yet another feature of the invention is characterized in that the first material member of each hose cover has a tubular shape and that the second material member is in the shape of a spiral formed around the cylindrical outer surface of the first material member. This feature of the invention facilitates insertion of hoses through each tubular first material member and also ensures, by means of the second material member, that the hose cover has the shape-retaining ability while having sufficient flexibility.

A work machine according to yet another feature of the invention is characterized in that main body-side outlets for drawing the hoses out of the main body are formed in the main body; traveling device-side outlets for drawing the hoses out of the traveling devices are respectively formed in the traveling devices; and that protectors are attached respectively to the edges of the main body-side outlets and the traveling device-side outlets. With the feature as above, damage to the hoses, which may otherwise be caused by contact with the edge of a main body-side outlet or a traveling device-side outlet, is prevented.

A work machine according to yet another feature of the invention is provided with a width changing device for changing the distance between the traveling devices in the direction of the width of the main body. With the feature as above, even in the bundled state, the hoses are permitted to move inside each hose cover together with a width changing movement of the corresponding traveling device.

DETAILED DESCRIPTION OF THE PREFERRED EMBODIMENTS OF THE INVENTION

Next, the present invention is explained in detail, referring to FIGS. 1 through 5.

Figure 4:
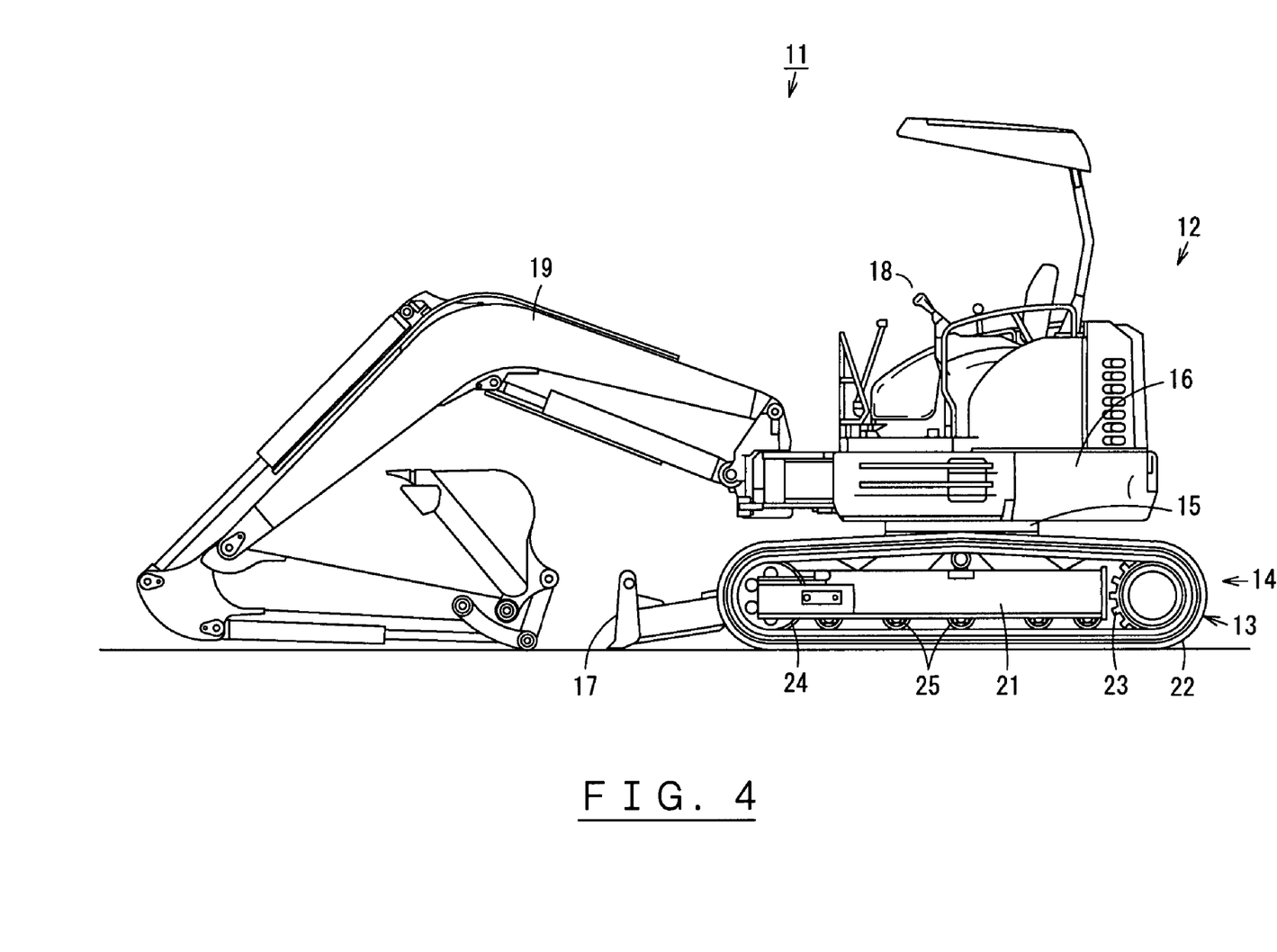
FIG. 4 is a side view of the work machine.
Figure 5:
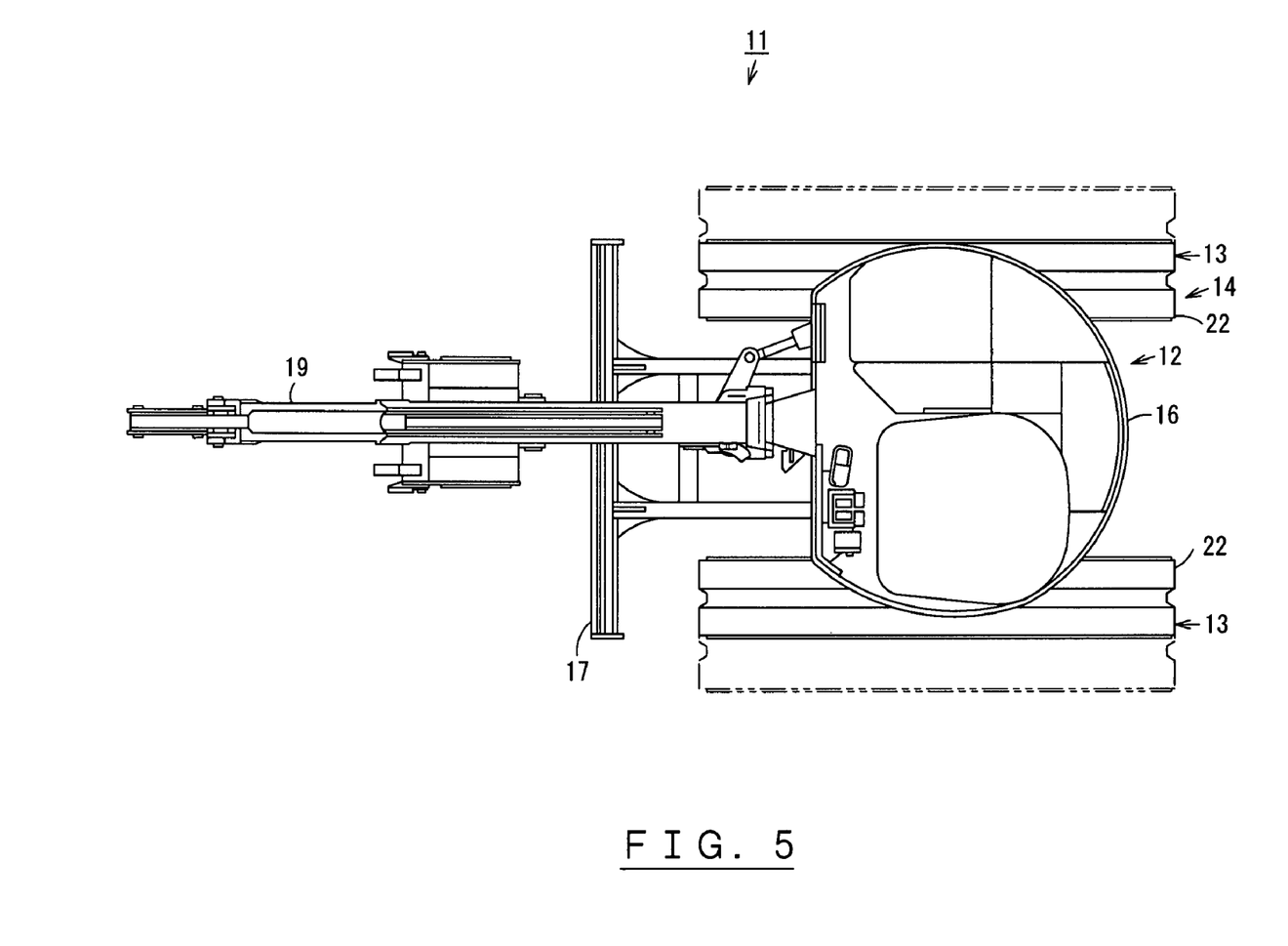
FIG. 5 is a top view of the work machine.

FIGS. 4 and 5 show a hydraulic excavator 11 as a work machine. The hydraulic excavator 11 has a main body 12 and traveling devices 13. The traveling devices 13 are respectively disposed at the two widthwise sides of the main body 12.

The main body 12 comprises an undercarriage 14 and an upper structure 16 rotatably mounted on top of the undercarriage 14, with a revolving unit 15 therebetween. The undercarriage 14 is able to move by means of traveling devices 13 provided at both sides of the undercarriage. A blade 17 is attached to the front end of the undercarriage 14. An operator's cab 18 is mounted on the top of the upper structure 16. A working unit 19 for excavation is attached to the front end of the upper structure 16. Although not shown in the drawings, various components including an engine, a hydraulic pump adapted to be driven by the engine, and a control valve unit for controlling supply and discharge of hydraulic oil to and from various fluid pressure-operated devices of the work machine 11 are installed in the upper structure 16. The hydraulic oil is hydraulic fluid supplied from the aforementioned hydraulic pump. The aforementioned engine and hydraulic pump together constitute a hydraulic pressure source.

Each traveling device 13 has a track frame 21, around which an endless crawler belt 22 is extended. A sprocket for driving the crawler belt 22 is disposed at the rear end of the track frame 21. An idler 24 is rotatably disposed at the other end, i.e. the front end, of the track frame 21. The idler 24 is adapted to rotate in the manner of free rotation together with movement of the crawler belt 22. A plurality of guide rollers for guiding the crawler belt 22 are rotatably disposed at the middle of the track frame 21.

Figure 1:
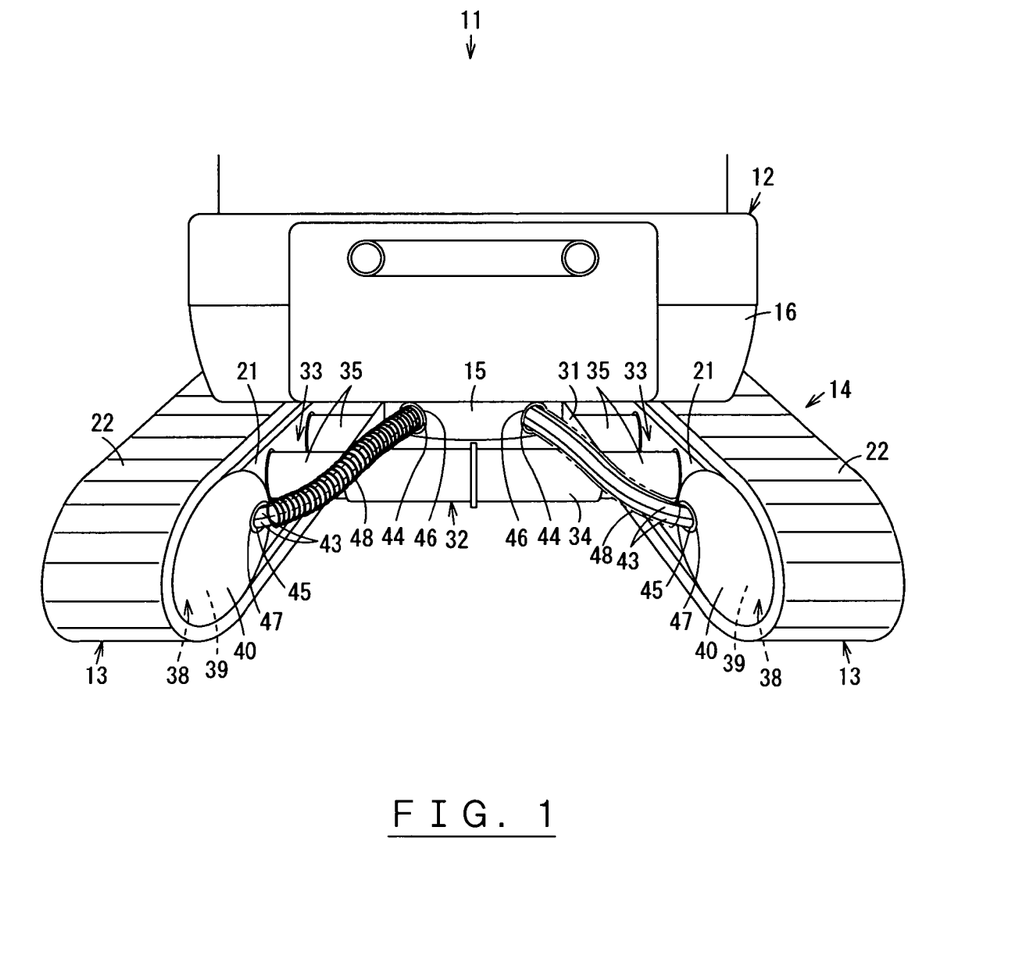
FIG. 1 is a perspective of a work machine according to an embodiment of the present invention in the state where the traveling devices are widely spaced apart.
Figure 2:
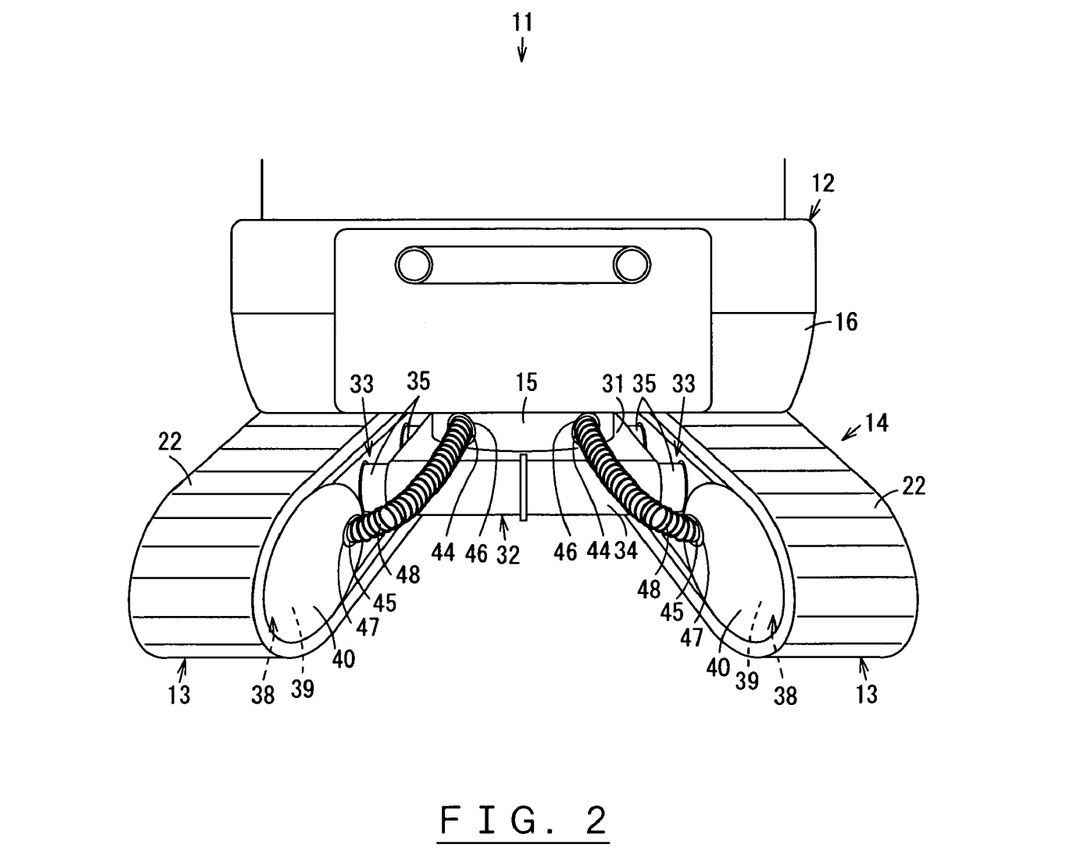
FIG. 2 is a perspective showing the state where the traveling devices are narrowly spaced apart.

As shown in FIGS. 1 and 2, the undercarriage 14 has a carriage platform 31, on top of which the revolving unit 15 is mounted. The aforementioned traveling devices 13 are respectively disposed at the two widthwise sides of the carriage platform 31 and supported by a width changing device 32 so that the widthwise distance between the traveling devices 13 can be increased or reduced. The width changing device 32 has a width changing support means 33 and a width changing drive means, which is not shown in the drawings. The width changing support means 33 serves to support the traveling devices 13 and permits the traveling devices 13 to move in the widthwise direction of the carriage platform 31 so that the distance between the traveling devices is increased or reduced. The width changing drive means serves to move the traveling devices 13 in the widthwise direction of the carriage platform 31, thereby increasing or reducing the distance between the traveling devices. The width changing support means 33 comprises tubular supporting frames 34 and slide frames 35. The supporting frames 34 are respectively attached to the front and rear ends of the carriage platform 31 so as to extend in the widthwise direction of the carriage platform 31. Each slide frame 35 is slidably fitted through an open end of each supporting frame 34 and, in this state, attached to the track frame 21 of the corresponding traveling device 13. The width changing drive means includes hydraulic cylinders (not shown), each of which is disposed between the carriage platform 31 and each respective track frame 21. As a result of operation of these hydraulic cylinders, the traveling device 13 at each side of the carriage platform 31 is operated independently from each other in a widthwise direction so as to increase or reduce the distance from each other.

Each traveling device 13 is provided with a traveling motor 39, which serves as a fluid pressure-operated device 38 to rotate the corresponding sprocket 23. The inner surface of each traveling motor 39 is covered by a motor cover 40.

The control valve unit of the main body 12 communicates with a swivel joint disposed at the center of revolving action. A plurality of flexible hoses 43 for supplying and discharging hydraulic oil to and from the swivel joint and the traveling motor 39 of each traveling device 13 extend between the swivel joint and the traveling motor 39 so as to connect the swivel joint and the traveling motor 39 from outside the main body 12 and the traveling device 13. The length of the hoses 43 is so set as to permit increase of the widthwise distance between the traveling devices 13.

A main body-side outlet 44 for drawing said plurality of hoses 43 outside is formed in the rear panel of the revolution unit 15 of the main body, at a location to each one of the opposing side edges of the rear panel. A traveling device-side outlet 45 for drawing the plurality of hoses 43 outside is formed in the motor cover 40 of each traveling device 13. An elastic protector 46,47 for protecting the hoses 43 is attached to the edge of each respective main body-side outlet 44 and traveling device-side outlet 45. The protectors 46,47 are made of an elastic material, such as grommet or rubber packing.

Figure 3:
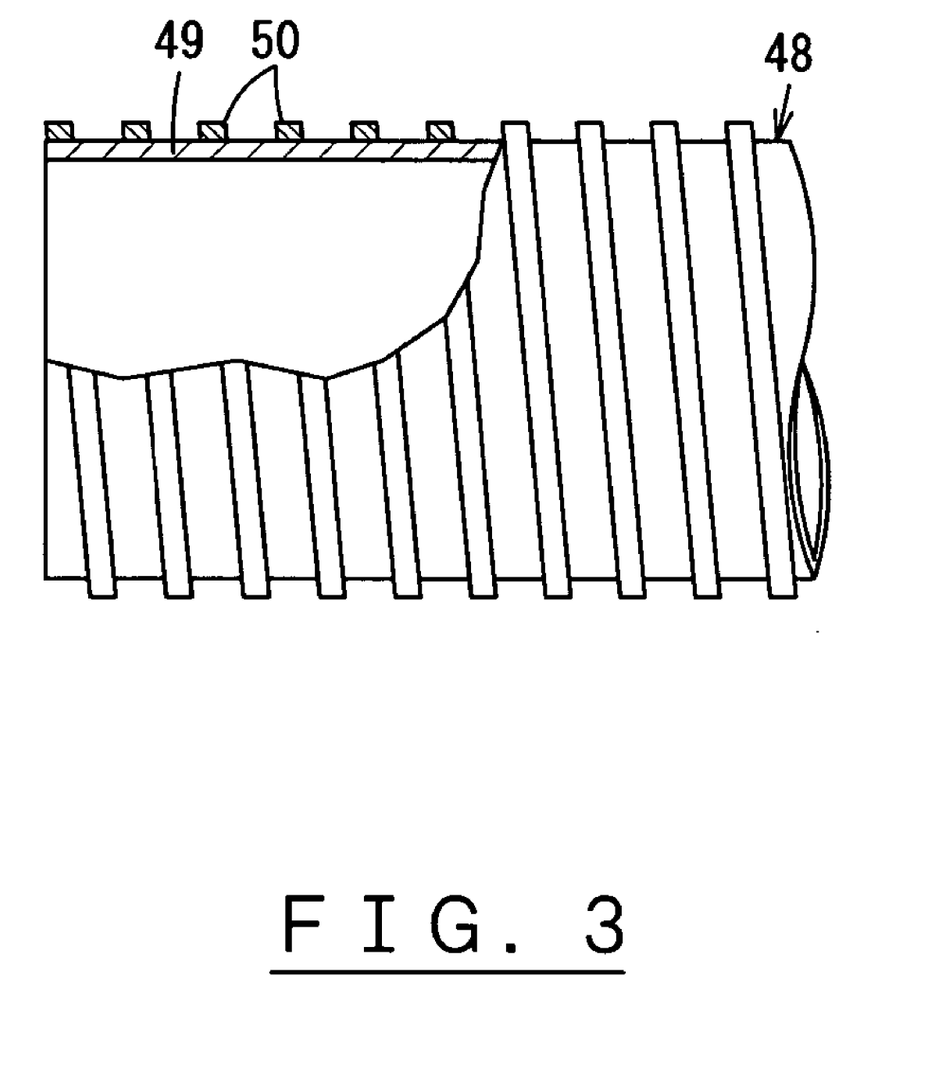
FIG. 3 is a side view of a part of a hose cover used for the work machine.

The hoses 43 connected to each traveling device are inserted through a flexible tubular hose cover 48 so that the portion exposed to the outside is housed in the hose cover 48. In order to show the state of the hoses 43, the right-side hose cover 48 as viewed in FIG. 1 is shown by two-dot chain line. As shown in FIG. 3, each hose cover 48 is of an integral, double construction consisting of a first material member 49 and a second material member 50. The first material member 49 is made of a flexible material, such as synthetic rubber. The second material member 50 is made of a material which is more rigid than the first material member 49 and has the ability to retain the shape, such as polypropylene. The first material member 49 has a cylindrical shape with a smooth inner surface having no unevenness. The second material member 50 is in the shape of a spiral winding around the outer surface of the first material member 49 at a given pitch. Each hose cover 48 has an inner diameter such that a plurality of hoses 43 can be contained in a bundle inside the hose cover 48 and, in this state, permitted to move therein together with a width-changing movement of the corresponding traveling device 13. The hose covers 48 have heat resistance sufficient to withstand the heat from the hoses 43, in which hydraulic oil flows with increasing temperature. Each hose cover 48 is flexible so as to easily cope with flexure of the hoses 43 contained therein. Each hose cover 48 ha an appropriate flexibility and also has the shape-retaining ability just sufficient to be able to prevent flexure of the hoses 43 due to their own weight or other unnecessary flexure of the hoses 43.

Next, the functions and effects of the present embodiment are explained hereunder.

When a plurality of hoses 43 are disposed between and connected to the main body 12 and each traveling device 13 during assembly of the work machine 11, the hoses 43 are inserted through a hose cover 48. At that time, the smooth inner surface of the hose cover 48, in other words, the inner surface of the first material member 49, which has no unevenness enables the easy insertion of the hoses 43. It is thus possible to bundle a plurality of hoses 43 easily merely by inserting them though a hose cover 48.

As the portion of the hoses 43 located between the main body 12 and each traveling device 13 and exposed to the outside is covered by the hose cover 48, the hose 43 are reliably protected, without the possibility of direct contact with an obstacle on the ground when the work machine is moving. The flexibility of each hose cover 48 enables the hose cover 48 to easily cope with flexure of the hoses 43, and the shape-retaining ability of the hose cover 48 maintains the hose 43 in an appropriate flexed shape while preventing unnecessary flexure of the hose 43. By containing a plurality of hoses 43 in each hose cover 48, the appearance of the work machine 11 is improved.

When the traveling devices 13 at both sides of the work machine 11 are widely spaced apart as shown in FIG. 1, the distance between the carriage platform 31 and each traveling motor 39 is increased. As a result, the hoses 43 disposed between the carriage platform 31 and the traveling motor 39 is pulled to extend straight so that each respective hose cover 48, too, extend straight together with the hoses 43.

When the widthwise distance between the traveling devices 13 at both sides of the work machine 11 is reduced as shown in FIG. 2, the distance between the carriage platform 31 and each traveling motor 39 is reduced. As a result, the hoses 43 disposed between the carriage platform 31 and the traveling motor 39 slack. At that time, although the hoses 43 are inclined to become distanced from one another due to their tendency to contort, the hose cover 48 covering the hoses 43 prevents the hoses 43 from becoming distanced and holds them in a bunch. As each hose cover 48 has the ability to retain its shape because of the second material member 50, it limits deformation of the cross sectional shape of each hose 43 due to movement of the hoses and remains gently curved to cope with the slack of the hoses 43.

As each hose cover 48 contains a plurality of hoses 43 that have merely been inserted through the hose cover 48, the hose cover 48 permits the hoses 43 to move therein together with a width changing movement of the corresponding traveling device 13. By thus preventing excessive stress from being applied to the hoses 43 or the hose covers 48, the embodiment described above prevents damage to the hose covers 48.

With the features of the embodiment described above, by merely inserting a plurality of hoses 43, which serve to connect the main body 12 and each traveling device 13 to each other, through a flexible tubular hose cover 48, it is possible to easily bundle the hoses and reliably cover the hoses to ensure their protection. Moreover, as the hoses 43 are permitted to move in the hose cover 48 together with a width changing movement of the traveling device 13, the hose covers 48 is protected from damage.

As a result of a double construction that consists of the first material member 49 and the second material member 50, each hose cover 48 has both sufficient flexibility to cope with the slack of the hoses 43 contained therein and the shape-retaining ability sufficient to maintain said slack to prevent unnecessary further slacking.

The first material member 49 of each hose cover 48 is formed in a tubular shape, and the second material member 50 is formed in the shape of a spiral around the cylindrical outer surface of the first material member 49. This feature facilitates insertion of hoses 43 through each tubular first material member 49 and also ensures, by means of the second material member 50, that the hose cover 48 has the shape-retaining ability while having sufficient flexibility.

The protectors 46,47 disposed along the edges of the main body-side outlets 44 and the traveling device-side outlets 45 prevent damage to the hoses 43, which may otherwise be caused by contact with the edge of a main body-side outlet 44 or a traveling device-side outlet 45.

The first material member 49 and the second material member 50 of each hose cover 48 may be formed as an integral body or, in an alternative structure, separate bodies to be assembled together afterwards. A double construction easily gives the hose covers 48 both flexibility and shape-retaining ability. However, the hose covers 48 may be of a single construction, provided that it is easy for the hose covers 48 to have both flexibility and shape-retaining ability. Furthermore, in order to ensure both flexibility and shape-retaining ability, it is also possible for the hose covers 48 to have a multi construction consisting of three or more walls.

In addition to the traveling motor 39, each traveling device 13 has other fluid pressure-operated devices 38, examples of which include a hydraulic cylinder to apply a tensile force to the crawler belt 22. It is possible to achieve the same functions and effects for the hoses for supplying and discharging hydraulic oil to and from such a hydraulic cylinder by placing the hoses in a bundle inside the corresponding hose cover 48 together with the hoses 43 for the traveling motor 39.

The invention as has been explained above refers to the embodiment wherein the work machine 11 is provided with a width changing device 32. However, the invention is also applicable to a work machine 11 that is not provided with a width changing device 32; in cases where the hoses 43 connecting the main body to the traveling devices 13 are exposed to the outside, the use of hose covers 48 provide the same functions and effects as described above.

INDUSTRIAL APPLICABILITY

A work machine according to the invention is not limited to a hydraulic excavator; provided that it involves a work machine of which hoses connected to the main body and the traveling devices are disposed externally, the invention is applicable to a wide range of work machines in order to solve problems arising from such disposition of the hoses.

The invention claimed is:

1. A work machine comprising:
   traveling devices, each of which is disposed at each widthwise side of a main body and provided with at least one fluid pressure-operated device,
   a plurality of flexible hoses consisting of a plurality of hoses communicatively extending from the main body to said fluid pressure-operated device of each traveling device via an outside of the main body and the traveling device so that hydraulic fluid is supplied to and discharged from the fluid pressure-operated device through said plurality of hoses, and
   flexible tubular hose covers, each of which is disposed between the main body and each respective traveling device and houses the plurality of hoses connected to said traveling device,
   wherein each hose cover has at least a double construction comprising:
      a flexible first material member; and
      a second material member having a greater ability to retain shape than the first material member, and wherein the hoses are inserted through the hose cover.

2. A work machine as claimed in claim 1, wherein:
   the first material member of each hose cover has a tubular shape; and
   the second material member is in the shape of a spiral formed around a cylindrical outer surface of the first material member.

3. A work machine as claimed in claim 2, further comprising:
   main body-side outlets for drawing the hoses out of the main body formed in the main body;
   traveling device-side outlets for drawing the hoses out of the traveling devices are respectively formed in the traveling devices; and
   protectors attached respectively to the edges of the main body-side outlets and the traveling device-side outlets.

4. A work machine as claimed in claim 1, further comprising:
   main body-side outlets for drawing the hoses out of the main body formed in the main body;
   traveling device-side outlets for drawing the hoses out of the traveling devices are respectively formed in the traveling devices; and
   protectors attached respectively to the edges of the main body-side outlets and the traveling device-side outlets.

5. A work machine as claimed in claim 1, wherein:
   the work machine is provided with a width changing device for changing the distance between the traveling devices in the direction of the width of the main body.

6. A work machine as claimed in claim 1, further comprising:
   main body-side outlets for drawing the hoses out of the main body formed in the main body;
   traveling device-side outlets for drawing the hoses out of the traveling devices are respectively formed in the traveling devices; and
   protectors attached respectively to the edges of the main body-side outlets and the traveling device-side outlets.

7. A flexible hose cover including a main body having traveling devices, each of which is disposed at each widthwise side of a main body and provided with at least one fluid pressure-operated device and a plurality of flexible hoses consisting of a plurality of hoses communicatively extending from the main body to said fluid pressure-operated device of each traveling device via an outside of the main body and the traveling device so that hydraulic fluid is supplied to and discharged from the fluid pressure-operated device through said plurality of hoses, comprising:
   a flexible first material member forming an interior volume; and
   a second material member have greater shape retention properties than the first material member and formed over an outer surface of the first material member;
   wherein the hoses are disposed within the interior volume.

8. A work machine as claimed in claim 7, wherein
   the first material member of each hose cover has a tubular shape, and
   the second material member is a spiral formed around a cylindrical outer surface of the first material member.

9. A work machine as claimed in claim 7, further comprising:
   main body-side outlets for drawing the hoses out of the main body formed in the main body;
   traveling device-side outlets for drawing the hoses out of the traveling devices are respectively formed in the traveling devices; and
   protectors attached respectively to the edges of the main body-side outlets and the traveling device-side outlets.

* * * * *